US011392583B2

(12) United States Patent
Mecocci et al.

(10) Patent No.: US 11,392,583 B2
(45) Date of Patent: Jul. 19, 2022

(54) SYSTEMS AND METHODS FOR MANAGING QUERIES FROM DIFFERENT TYPES OF CLIENT APPLICATIONS

(71) Applicant: Palantir Technologies Inc., Palo Alto, CA (US)

(72) Inventors: Giulio Mecocci, Brooklyn, NY (US); Brandon Krieger, Brooklyn, NY (US); Matthew Lynch, Brooklyn, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 16/684,833

(22) Filed: Nov. 15, 2019

(65) Prior Publication Data

US 2021/0103585 A1  Apr. 8, 2021

Related U.S. Application Data

(60) Provisional application No. 62/909,905, filed on Oct. 3, 2019.

(51) Int. Cl.
| | |
|---|---|
| *G06F 16/24* | (2019.01) |
| *G06F 16/9035* | (2019.01) |
| *G06F 16/242* | (2019.01) |
| *G06F 16/2453* | (2019.01) |
| *G06F 21/62* | (2013.01) |

(52) U.S. Cl.
CPC .... *G06F 16/2448* (2019.01); *G06F 16/24539* (2019.01); *G06F 16/24542* (2019.01); *G06F 16/9035* (2019.01); *G06F 21/6227* (2013.01)

(58) Field of Classification Search
None
See application file for complete search history.

(56) References Cited

U.S. PATENT DOCUMENTS

| | | | |
|---|---|---|---|
| 6,351,775 B1* | 2/2002 | Yu | G06F 6/245 |
| 6,895,584 B1* | 5/2005 | Belkin | G06F 16/2448 |
| 7,395,310 B1* | 7/2008 | Sikora | G06F 16/24539 |
| 7,587,487 B1* | 9/2009 | Gunturu | G06F 16/2448 |
| | | | 707/999.104 |

(Continued)

FOREIGN PATENT DOCUMENTS

| | | |
|---|---|---|
| EP | 3336690 A1 | 6/2018 |
| EP | 3800866 A1 | 7/2021 |

*Primary Examiner* — Son T Hoang
(74) *Attorney, Agent, or Firm* — Faegre Drinker Biddle & Reath LLP

(57) ABSTRACT

Systems and methods provide a first group of computation modules configured to provide back-end compute resources for a first type of computation module by back-end compute resources. Systems and methods provide a second group of computation modules that are configured to provide back-end compute resources for a second type of computation module wherein the first and second type of computation modules are of different types. In some examples, methods and systems identify the type of computation module needed by each of a plurality of queries associated with different types of client applications based on computation module type data associated with each query and route each of the plurality of queries to an appropriate computation module within the first or second computation modules based on the computation module type data. Related methods are also disclosed.

20 Claims, 4 Drawing Sheets

(56) References Cited

U.S. PATENT DOCUMENTS

| | | | |
|---|---|---|---|
| 9,032,017 B1 | 5/2015 | Singh et al. | |
| 10,230,683 B1* | 3/2019 | Goodsitt | G06F 16/252 |
| 10,409,641 B1 | 9/2019 | Blessing et al. | |
| 10,606,851 B1 | 3/2020 | Lynch et al. | |
| 2005/0165881 A1 | 7/2005 | Brooks et al. | |
| 2010/0115040 A1* | 5/2010 | Sargent | G06F 16/9035 |
| | | | 707/609 |
| 2010/0169308 A1* | 7/2010 | Das | G06F 16/972 |
| | | | 707/736 |
| 2011/0126292 A1* | 5/2011 | Ferg | G06F 16/245 |
| | | | 707/706 |
| 2012/0059839 A1* | 3/2012 | Andrade | G06F 16/252 |
| | | | 707/760 |
| 2014/0082288 A1* | 3/2014 | Beard | G06F 16/172 |
| 2014/0207794 A1* | 7/2014 | Du | G06F 16/2471 |
| | | | 707/748 |
| 2014/0379921 A1* | 12/2014 | Morley | G06F 16/245 |
| 2015/0026236 A1* | 1/2015 | Solter | G06F 16/2448 |
| 2015/0379061 A1* | 12/2015 | Paraschivescu | G06F 16/2329 |
| | | | 707/695 |
| 2017/0019873 A1* | 1/2017 | Britt | G06F 16/22 |
| 2018/0307728 A1* | 10/2018 | Crupi | G06F 16/27 |
| 2019/0114359 A1* | 4/2019 | Yeh | G06F 16/24575 |
| 2020/0167333 A1 | 5/2020 | Lafleche et al. | |

\* cited by examiner

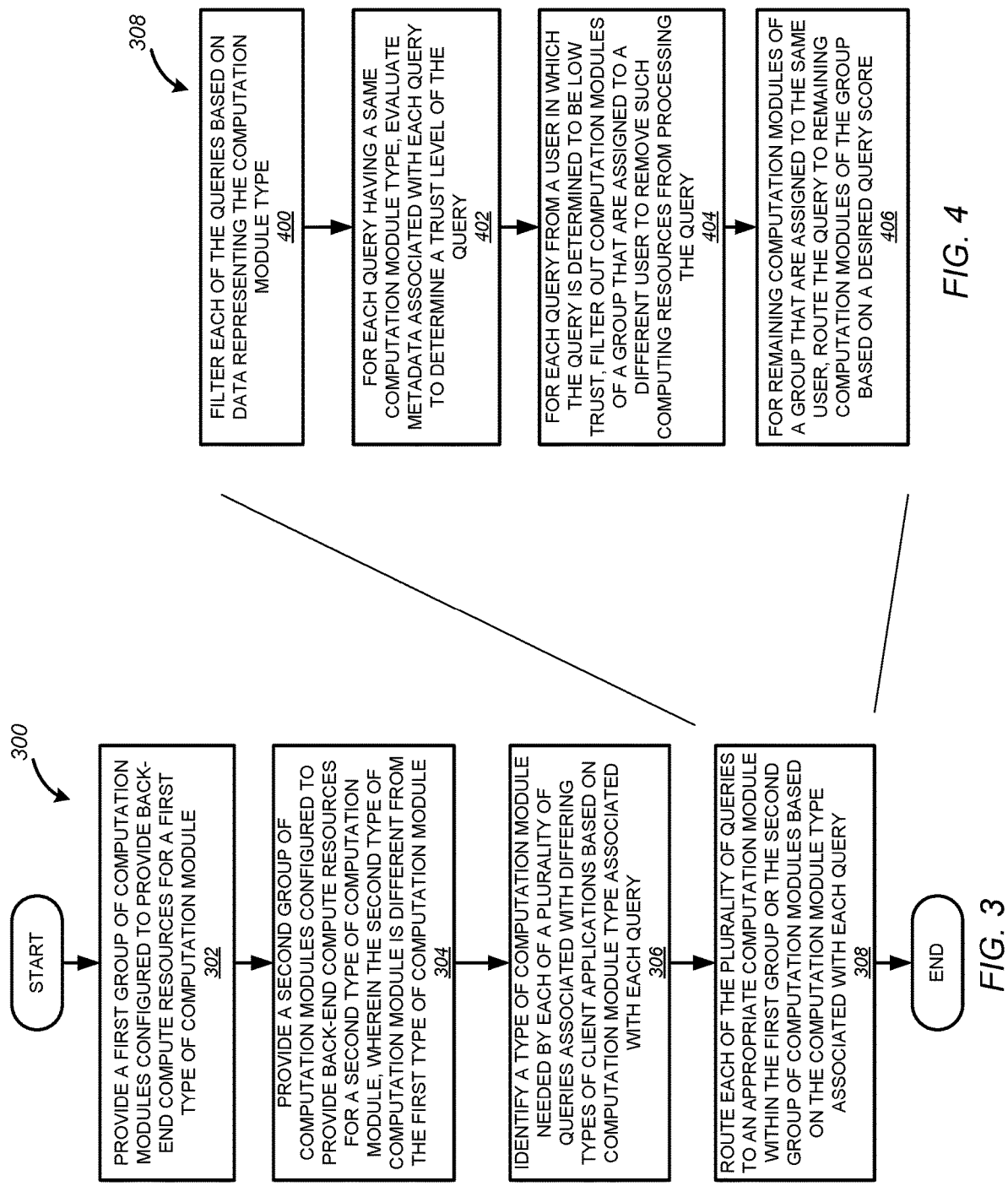

SYSTEMS AND METHODS FOR MANAGING QUERIES FROM DIFFERENT TYPES OF CLIENT APPLICATIONS

1. CROSS REFERENCE TO RELATED APPLICATIONS

This application claims priority to U.S. Provisional Application No. 62/909,905, filed Oct. 3, 2019, incorporated by reference herein for all purposes.

2. BACKGROUND

The present disclosure relates to systems and techniques for performing compute requests on a number of resources. More specifically, this disclosure relates to techniques for managing queries from different types of client applications.

Large scale, multicomputer datacenters host large quantities of data. In response to user queries to manipulate the large quantities of data, the datacenter may distribute a "compute request" to one of a number of back-end compute resources using a resource allocation system. The compute request is a communication from the datacenter for a particular compute resource to perform processing data as stipulated in a user query. Multi-computer data centers rely on load balancers to route queries and distribute load across available compute resources. Generic load balancers lack domain knowledge about queries and cannot effectively interpret them to identify similarity, which results in not taking full advantage of caching functionality.

Depending on the complexity of a query, or the size of the one or more data sets, the amount of processing involved can vary significantly. Also, certain compute requests may contain user defined code, which may introduce risks when performing the compute request. In addition, historical information associated with prior executions of compute requests may not be collected or considered for routing compute requests. Also, the resource allocation system typically provides a query processing service that only knows how to manage computation modules of the type provided by a single type of client application. Accordingly, a system to manage lifecycle and query routing for an interactive computation that involves differing types of computation modules from different types of client applications is needed.

3. SUMMARY

To address these and other issues, embodiments of systems and methods of a server system configured to dispatch compute requests for client applications of differing types, such as those that having differing levels of trust and/or require different types of compute resources for their queries such as different coding languages of jobs and different coding languages of modules, to appropriate compute resources (e.g., modules), to increase efficiency and lower risk during processing are disclosed herein. In some embodiments, systems and methods provide a first group of computation modules configured to provide back-end compute resources for a first type of computation module and provide at least a second group of computation modules configured to provide back-end compute resources for a second type of computation module, wherein the second type of computation module is different from the first type of computation module. In certain embodiments, a router in a resource allocation system identifies a type of computation module needed by each of a plurality of queries associated with differing types of client applications based on computation module type data associated with each query. In some embodiments, the router routes each of the plurality of queries to an appropriate computation module within the first group or the second group of computation modules based on the computation module type data associated with each query.

In certain embodiments of the present disclosure a method for managing queries for processing operations on one or more data sets by back-end compute resources includes providing a first group of computation modules configured to provide back-end compute resources for a first type of computation module; providing a second group of computation modules configured to provide back-end compute resources for a second type of computation module, wherein the second type of computation module is different from the first type of computation module and identifying a type of computation module needed by each of a plurality of queries associated with differing types of client applications based on computation module type associated with each query. In some embodiments the method includes routing each of the plurality of queries to an appropriate computation module within the first group or the second group of computation modules based on the computation module type associated with each query. The method is carried out by one or more processors.

In certain embodiments, a system for managing queries for processing operations on one or more data sets by back-end compute resources includes one or more processors and a non-transitory storage medium that stores executable instructions that when executed by the one or more processors, causes the system to provide a first group of computation modules configured to provide back-end compute resources for a first type of computation module by back-end compute resources. The one or more processors in the system, in some embodiments, provide a second group of computation modules configured to provide back-end compute resources for a second type of computation module by back-end compute resources, wherein the second type of computation module is different from the first type of computation module. In certain embodiments the one or more processors identify a type of computation module needed by each of a plurality of queries associated with differing types of client applications based on computation module type data associated with each query and route each of the plurality of queries to an appropriate computation module within the first group or the second group of computation modules based on the computation module type data associated with each query.

In some embodiments, the routing of each of the plurality of queries comprises routing a query based on data representing a level of trust of the query.

In some embodiments, the method and system routes each of the plurality of queries by at least: filtering each of the queries based on data representing the computation module type; for each query having a same computation module type, evaluating metadata associated with each query to determine a trust level of the query; for each query determined to be low trust for a user, filtering out computation modules of a group that have been previously assigned to a different user to remove such computing resources from processing the query; and for remaining computation modules of a group that are assigned to that user, route the query to remaining computation modules of the group having a desired score.

In some embodiments, the method and system routes each of the plurality of queries by at least: filtering each of the queries based on data representing the computation module type; for each query having a same computation module type, evaluating metadata associated with each query to determine a trust level of the query; for each query determined to be low trust for a user, assigning to the query only computation modules of a group that have been previously assigned to that user; and for remaining computation modules of a group that are assigned to the same user, route the query to remaining computation modules of the group having a desired score.

In some embodiments, the method may comprise, and the system may be configured to perform, scaling a number of computation modules in each of the first and second group of computation modules based on the computation module type.

In some embodiments, the routing of each of the plurality of queries comprises routing a query based on data representing a probability of cache hits associated with each of the plurality of queries.

In some embodiments, the method may comprise, and the system may be configured to perform, checking a reliability of a new version of compute code used by each of the first and second group of computation modules based on historical data and the computation module type data.

In some embodiments, the method may comprise, and the system may be configured to perform, providing an application interface (API) configured to interface with the differing types of client applications and to produce configuration data for a module group manager to configure and manage the first and second groups of computation modules.

In some embodiments, the method may comprise, and the system may be configured to perform, providing an application interface (API) configured to interface with the differing types of client applications and to provide a single interactive computation query for processing that includes individual queries by different types of applications.

In certain embodiments, a non-transitory storage medium that stores executable instructions that when executed by one or more processors, causes the one or more processors to: provide a first group of computation modules configured to provide back-end compute resources for a first type of computation module by back-end compute resources; provide a second group of computation modules configured to provide back-end compute resources for a second type of computation module by back-end compute resources, wherein the second type of computation module is different from the first type of computation module and identify a type of computation module needed by each of a plurality of queries associated with differing types of client applications based on computation module type data associated with each query. In certain embodiments the non-transitory storage medium stores executable instructions that when executed by one or more processors, causes the one or more processors to route each of the plurality of queries to an appropriate computation module within the first group or the second group of computation modules based on the computation module type data associated with each query.

Depending upon the embodiment, one or more benefits may be achieved. These benefits and various additional benefits can be fully appreciated with reference to the detailed description and accompanying drawings that follow.

4. BRIEF DESCRIPTION OF THE DRAWINGS

The implementations will be more readily understood in view of the following description when accompanied by the below figures, wherein like reference numerals represent like elements, and wherein:

FIG. 3 illustrates a flowchart showing a method for managing queries for processing operations on one or more data sets by back-end compute resources.

FIG. 4 illustrates a flowchart showing a method for managing queries for processing operations on one or more data sets by back-end compute resources.

5. DETAILED DESCRIPTION

Figure 1:
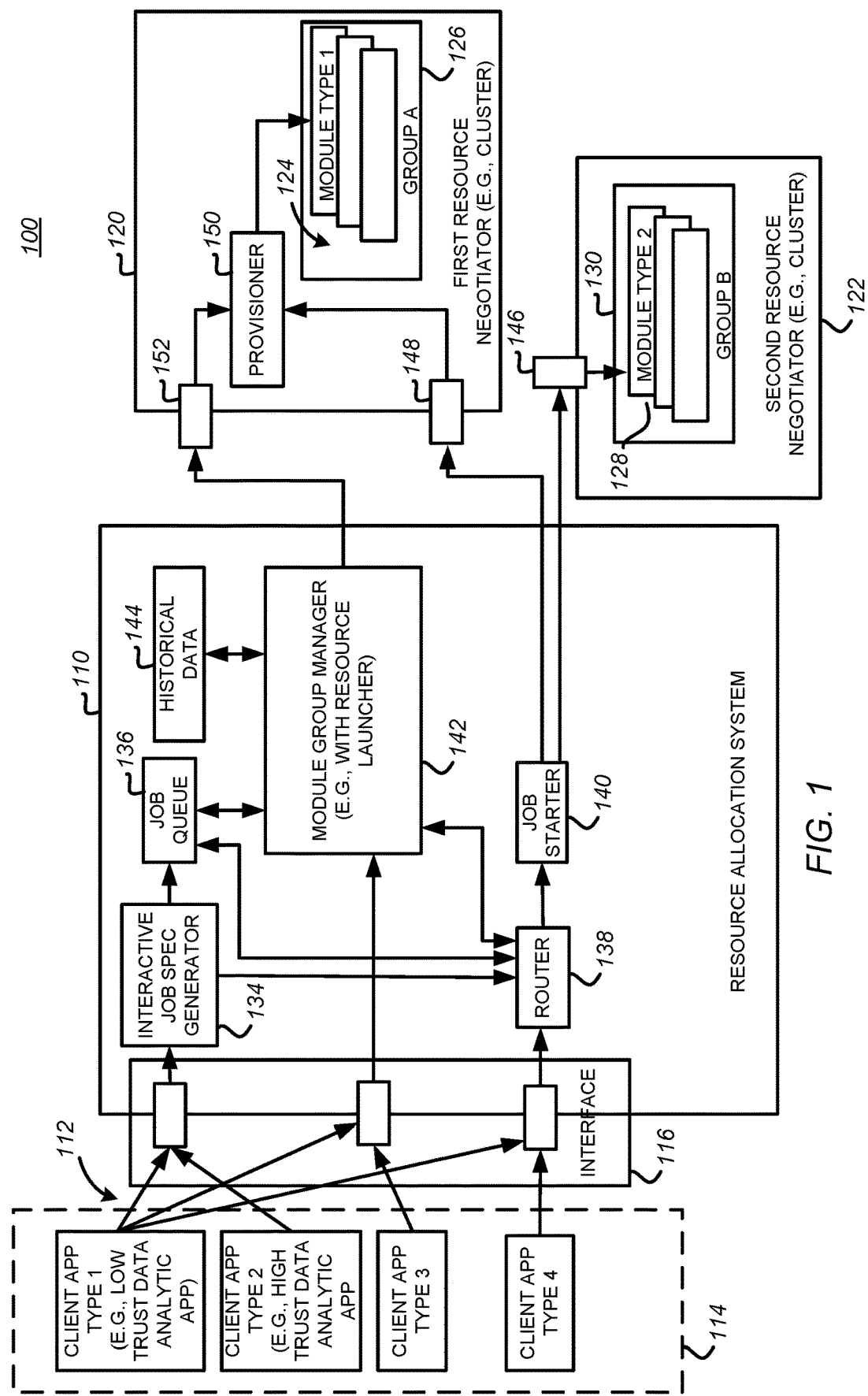
FIG. 1 illustrates a schematic of an overview of an embodiment of a resource allocation system in accordance with one example set forth in the disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Aspects of the subject technology are directed to systems and methods for managing queries from different types of client applications. In certain embodiments, a resource allocation system provides a first group of computation modules configured to provide back-end compute resources for a first type of computation module by back-end compute resources. In addition, a second group of computation modules are provided that are configured to provide back-end compute resources for a second type of computation module wherein the first and second type of computation modules are of different types. In some examples, the resource allocation system identifies the type of computation module needed by each of a plurality of queries associated with different types of client applications based on computation module type data associated with each query and routes each of the plurality of queries to an appropriate computation module within the first or second computation modules based on the computation module type data.

In some embodiments, the resource allocation system employs a router that filters each of the queries based on data representing the computation module type, and for each query having a same computation module type, evaluating metadata associated with each query to determine a trust level of the query. In some examples, the router, for each query determined to be low trust for a user, filters out computation modules of a group that have been previously assigned to a different user to remove such compute resources assigned to other users from processing the query. For remaining computation modules that are assigned to the same user, the router routes the query to the remaining computation module group based on a desired query score.

In some embodiments, benefits include significant improvements, including for example, a resource allocation system that facilitates the running of a computation composed of parts authored in different services or from different types of client applications that are part of an interactive computation. The resource allocation system handles the lifecycle management and routing of queries for multiple differing types of client applications whose queries require interactive workflows, as opposed to scheduled transformations that do not require active user interaction. For example, applications that interact to compute some logic in an interactive fashion, as opposed to regularly scheduled job builds, submit an interactive job specification to the resource allocation system which computes the job and returns relevant results from queries associated with differing types of client applications. Also, a resource allocation system provides improved management of computation modules from multiple differing types of client applications that employ different types of computation modules for processing data sets.

In certain embodiments, one or more solutions rooted in computer technology overcome one or more problems specifically arising in the realm of computer technology. Some embodiments are directed to computing platforms that include resource allocation systems that handle differing module types for differing types of client applications and/or facilitate interactive compute operations for data set generation. Some embodiments are directed to computing platforms including hosts and networking devices. In some examples, the computing platforms include virtual servers or virtual machines. In certain examples, the computing platforms include a virtual computing environment that provides an operating system and/or an application server for running one or more containers. For example, a container includes a containerized application. In some examples, one or more containers run on a server or host machine of the computing platform and are associated with particular resources that include CPU, memory, storage, and/or networking capacity.

As background, the user-driven process of preparing queries (e.g., filtering, transformations) for a data set may be referred to as front-end processing. Conversely, processing of the large data set, or operations that are performed on the large data set may be referred to as "back-end processing." As an example, front-end processing is performed on a data subset (i.e., data set "preview") when a user is determining operations to clean and prepare the large data set for further processing or analysis; the determined operations are not executed immediately on the front-end but deferred for back-end-processing once the fully constructed query is submitted. As another example, back-end processing is performed when applying the operations described in the query during front-end processing to the complete data set.

FIG. 1 illustrates a schematic of an embodiment of a resource allocation system 110 that is part of a computing platform 100 (e.g., a data center). The resource allocation system 110 includes various functionality, for example, for receiving queries generally shown as 112, from differing types of applications generally shown as 114 that are different in that they at least are coded in different languages (e.g., PYTHON vs. JAVA) and/or use or do not use user defined code. The applications are provided, in one example through an application server and are used by data analysts, for example, through client devices to perform data analytic operations on data sets. Each of the different types of applications provide, for example, a plurality of queries as incoming queries to the resource allocation system 110. Data analysts working, for example, on client devices may generate the queries. The resource allocation system 110 may receive the queries via an interface 116 (e.g., one or more APIs) that may be, for example, coupled to a communication network that allows communication of queries from multiple applications to the resource allocation system. Interface 116 is provided, in some instances by the resource allocation system as one or more application interfaces that are configured to interface with the differing types of client applications to produce configuration data such as a configuration file for the module group manager 142 to allow the module group manager to configure and manage the groups of computation modules. For example, the interface 116 presents a configuration file for each of the respective client applications 114 which allows the inclusion of the module type data 205 to be placed as part of the job specification (query). However, any suitable configuration may be employed.

The platform 100 also includes back-end compute resources 120 such as those in a first computing cluster and other compute resources generally shown as 122 that are in another computing cluster. The back-end compute resources are assigned to carry out various queries. Each of the back-end compute resources include, for example, CPU processing capability, associated memory to serve as a computation module that are configured to provide back-end compute resources. The information provided back to a client device after processing the query includes, for example, a link to a data set resulting from the query, the data set itself, or information that indicates where the resulting data set may be found, for example on a storage device in communication with the resource allocation system or other location.

The compute resources 120 and 122 in this example include computation modules (also referred to as modules). A computation module may refer to stored software, a software component, a program or a part of a program that includes one or more routines to perform work. A module may include one or more routines for performing a particular work or a particular portion of a work. A computation module may provide end-points (e.g., HTTP end-points) for starting and canceling jobs.

Running a module may consume compute resources such as processing power, processing time, and/or memory. The number of modules that may be run at once may be limited by the pool of available compute resources. Starting up a module for a job takes some amount of time. For example, starting up a work for some jobs may take up to 1-2 minutes. As used herein, compute resources can include the modules and/or associated processing components such as CPUs and/or memory. In this example, compute resources 120 are configured as multiple modules 124 configured in a first group 126. In this example, all of the computation modules 124 are of the same type such as having the same programming code language (e.g., PYTHON). Compute resources 122 in this example are configured as multiple computation modules 128 of a different type, such as of a type employing a different programming language (e.g., JAVA) and are configured as another group 130. Where modules are spark modules, a spark type module manager may be employed. However, any suitable modules may be employed.

In some examples, the resource allocation system 110 includes an interactive job specification generator 134, a job queue 136, a router 138, a job starter 140, and a module group manager 142. A database 144 is used in one example to store historical data representing operational error amounts for new versions of modules or other historical data. The interface 116 may be one or more application interfaces (APIs) or other service that allows particular client applications to provide compute requests for back-end compute resources through various components of the resource allocation system 110.

As shown in this example, client application of type 1 (e.g., written in PYTHON or PYTHON+JAVA) and client application of type 2 (e.g., written in JAVA or Latitude Set Description) each interface with the interactive job specification generator 134. Client application of type 1 in this example can also access the module group manager 142. Client application type 3 accesses the resource allocation system through the module group manager 142 whereas client application type 4 can interface with the resource allocation system 110 directly through the router. The resource allocation system 110 is configured to interface with multiple different types of client applications.

The module group manager 142 provides the different groups of computation modules 126 and 130 that are configured to provide back-end compute resources, such as processing power and memory that are used by the modules for carrying out jobs. As noted above, the types of modules 124 and 128 are different types of computation modules. The module group manager 142 may assign jobs to the modules. A job may refer to a unit of work to be performed. A job may include one or more operations to be performed. For example, a job may include an application of a module to do work, such as reading, writing, and/or transforming data. Other types of jobs are contemplated. A job may be performed by one or more modules. The module group manager 142 may accept incoming jobs from clients and submit the jobs to modules. A job may only be assigned to a compatible module. Compatibility between a job and a module is determined based on module type data which may be, for example, included in a field of a job specification or other data structure which is determined by the module group manager 142 so that the module group manager can create and manage modules as needed based on queries coming from the different types of client applications 114. In one implementation, module type data indicates a particular coding language being used by the job and as such, requires a particular module type that is coded in the same language. Other information used by the module group manager 142 includes, for example, the libraries referenced by the job/module configuration settings, user ID or any other suitable data.

The module group manager 142 in one example manages multiple differing types of modules using module type data in a "type" field. As further set forth below, the module group manager 142 also checks a reliability of new versions of code from modules by obtaining historical error rate data for modules executing the new code and comparing the error rate to a threshold. The module group manager 142 in this example provides more of the new code modules as the error rate is determined to be increasing to a suitable level. For example, a previous version of a module type and a subsequent newer version of the module type can be gradually switched out based on the error rate of the new code being detected to be low such as a threshold below 10% or any other suitable threshold.

The module group manager 142 is configured to scale a number of computation modules in each of the groups 126, 130 of computation modules based on the computation module type. For example, as noted above, the module group manager 142 determines from the module type data 205 (see FIG. 2, to be described later on) whether an appropriate number of module types in a particular group are available to service the upcoming jobs in a job queue and if not, scaling up of the particular module types will occur or scaling down of module types can occur if too many module types are currently available in a group.

In some implementations, the interactive job specification generator 134 is configured to receive one or more jobs from the client applications 114. A job may be received directly from a client device or indirectly through one or more intermediary/communication devices. A client may refer to hardware or software that uses and/or accesses one or more services made available by a server. For example, a client may include a computer, computer component, an application, an application component, a process and/or other hardware/software that request one or more operations to be performed by or through a server. A client and a server may be part of the same computing system or may be on different computing systems. For example, a client may communication with a server through one or more networks.

As used herein, a query can be equated to a job or a portion of a job. Jobs are queued in the job queue 136 and are used by the module group manager 142 to determine which type of computation modules need to be created and/or managed for one or more jobs. The jobs are provided to the router 138 for routing to appropriate modules that are being managed by the module group manager 142. The job starter 140, in some examples, provides job specifications to the differing compute resources such as clusters of nodes. The group of computation modules 126 and 130 may be accessible through resource negotiators generally shown as 146 and 148. The module group manager 142 may also provide instruction for a module provisioner 150 to create, terminate or make available various module types. This may be done through any suitable interface 152. The various components that are shown are for illustration purposes only and may be suitably combined or otherwise varied as desired.

The resource allocation system 100 may be implemented as any suitable structure including one or more hardware servers that includes, for example, one or more processors that execute stored instructions. The stored instructions may be stored in memory which may be any suitable non-transitory storage medium. The one or more processors when executing the stored instructions, operate as the resource allocation system 110 described herein. The module group manager 142 communicates with varying resource launchers 150 and 152 depending upon which cluster a query is to be processed for.

The back-end compute resources may be configured to have different processing power. The processing power may relate to, for example, the number of CPUs or type of CPUs allocated to the compute resource, an interface speed of the compute resource, the amount of RAM memory or other type of memory allocated to the compute resource, the amount of cache memory on one or more CPUs of the compute resource, the speed of one or more of the CPUs of the compute resource, and/or any other hardware, software or firmware characteristic or feature of a compute resource that affects its processing power. Back-end compute resources can be configured to have certain levels of processing power so that some have a higher level of processing power than others.

Figure 2:
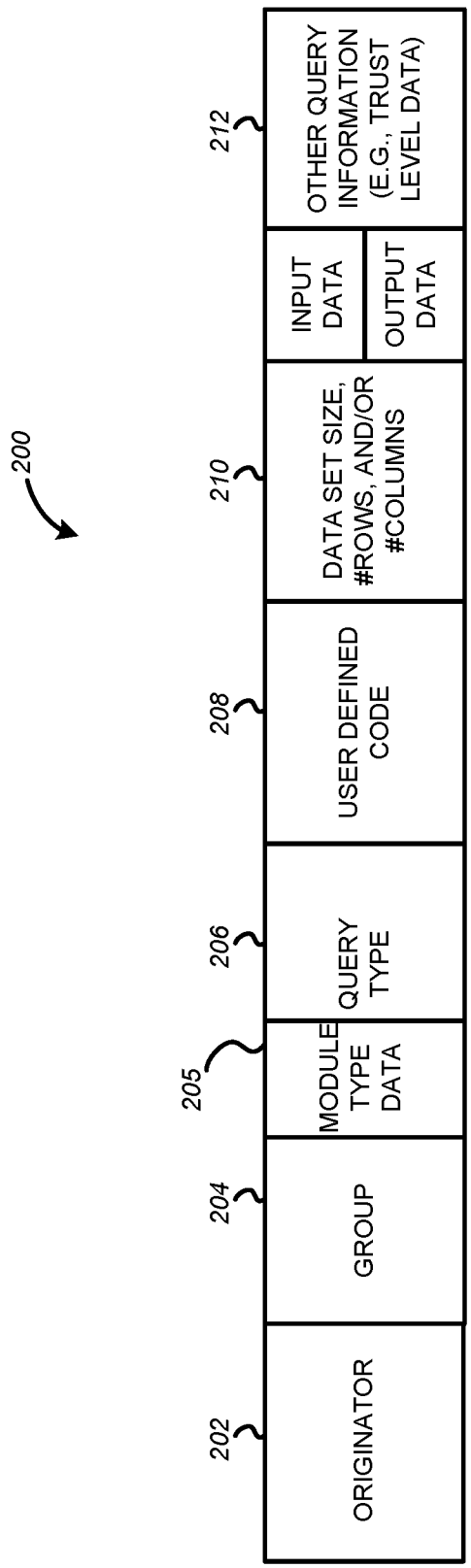
FIG. 2 illustrates an example of data that may be included in a query received by the system illustrated in FIG. 1.

FIG. 2 illustrates one example of query information that may be included in a query 200 received by the resource allocation system 110 illustrated in FIG. 1. In this example, the query 200 may include one or more of a query originator 202, a group originator 204, a query type 206, user defined code 208, information related to the data set that is to be processed 210, and/or other types of query information 212. In various embodiments, the query information may be in various formats, for example, data type of a Boolean (true or false), double (fractional numbers), integer (whole numbers), long (large whole numbers), date, or timestamps (instants in time), double (fractional numbers), integer (whole numbers), or long (large whole numbers), or any other data format that is readable by the resource allocation system 110.

The query originator 202 may include information that identifies the originator of the query, for example, a data analyst that generated the query. The group originator 204 may specifically indicate a group that the query originated from. For example, a number of data analyst may be part of a particular group that typically generates similar types of queries that may require similar compute resources to process.

The module type data 205 indicates a module type needed by the query. The router 138 identifies the type of computation module needed by each query using the module type data 205. The router 138 then routes each query to an appropriate computation module that matches the type for the differing module types 124 and 128. In this manner, the same router 138 can route interactive queries from different types of client applications. The job specification in another example may include an artifact descriptor that indicates the type of logic that the query is required to be performed such as a transformation, read, write, or other operation. As such, the module type data may be employed as part of a job specification data, query and/or both. In other implementations, the query 200 is a different query type depending upon the type of application from which the query originates. As such, the module type data 205 also can indicate the type of client application. For example, a client application may use a config file or other mechanism to issue queries and each client is assigned its own config file which is processed by the resource allocation system.

The query type 206 may include information that indicates what type of processing is required for this query, the type relating to the processing involved or the extent of computing is that is necessary. For example, the query type 206 may indicate the operations to be performed are one or more filtering operations, transformations, and/or search-and-replace of information in the data set. In some embodiments, the query type 206 includes a value from a predetermined list that indicates a type of processing that is needed for this query.

The user defined code 208 may be custom written queries or other computation instructions provided by an analyst for a particular processing task. In some embodiments, any time a query 200 contains user defined code, the router (not shown) identifies that such user defined code exists and treats the query as a low trust query. If the query does not contain user code, the router treats the query as a high trust query. Compute request may also include lifecycle control information for the back-end compute resource that will process the compute request, the lifecycle information including instructions that are specifically defined to lower risk of performing such user defined code in a processing operation. These instructions may include, for example, a time limit for the processing to occur to mitigate against the user defined code creating an endless loop of processing. In another example, the instructions may include "kill" information to stop the back-end compute resource after it completes the compute request, mitigating against the user defined code affecting subsequent operations of the back-end compute resource. In another example the instructions may include "kill" information to stop the back-end compute resource if certain conditions occur, for example, if CPU time that is being used for processing exceeds a certain limit, if memory being used for the processing exceeds a certain limit, or if the back-end compute resource request additional resources (e.g., memory allocation), or if other unexpected processes are initiated by the back-end compute resource performing the processing with the user defined code.

The query 200 may also include a variety of other query information 212 that defines the requested processing task. In various embodiments, the other query information 212 may also be used during the query scoring process. In some embodiments, a score may be determined for one or more or each of the information that is in the query 200, and the final query score is determined based on these one or more scores. In some embodiments, the resource allocation system 110 uses a lookup table with predetermined information to match the information in the query 200 with an appropriate score.

The query 200 may also include a variety of other query information 212 that defines the requested processing task. In various embodiments, the other query information 212 may also be used during the query scoring process. In some embodiments, a score may be determined for one or more or each of the information that is in the query 200, and the final query score is determined based on these one or more scores. In some embodiments, the resource allocation system 110 uses a lookup table with predetermined information to match the information in the query 200 with an appropriate score.

FIG. 3 illustrates one example of a method 300 for managing queries for processing operations on one or more data sets by back-end compute resources as carried out by the resource allocation system 110. This diagram is merely an example, which should not unduly limit the scope of the claims. One of ordinary skill in the art would recognize many variations, alternatives, and modifications. As shown in block 302, the method includes by way of example, the module group manager 142 providing a first group 126 of computation modules 124 configured to provide back-end compute resources for a first type of computation module. For example, the module group manager evaluates the job queue 136 which contains job specification data such as data shown in FIG. 2 and determines based on the module type data 205, how many modules of a particular type will be needed in view of those that have already been created and may be available for use in the already existing group. The module group manager 142 may determine that an insufficient number of modules of a particular type will be available and hence creates additional modules and/or groups. The availability of module types is provided to the router 138 so the router can suitably route queries to appropriate module types that are available. As shown in block 304, the module group manager 142 provides a second group 130 of computation modules 138 configured to provide back-end compute resources for a second type of computation module where in the second type of computation module is different from the first type of computation module. In a similar fashion as described with respect to block 302, the module group manager evaluates the module type data from the queries in the job queue to determine a suitable number of computation modules for each module type and informs the respective compute resource clusters 120 and 122 and their associated provisioners 150, for example, to create and/or reassign modules in one or more groups.

As shown in block 306, the method includes identifying a type of computation module needed by each of a plurality of queries associated with differing types of client applications, based on computation module type, such as computation module type data 205 associated with each query. This may be done, for example, by the router 138. For example, a query that has a module type indicating module type 1 is routed to the group A 126 whereas a query that indicates a module type 2 is routed to group B 130. For example, as shown in block 308, the method includes routing each of the plurality of queries to an appropriate computation module within the first group or the second group of computation modules based on the computation module type associated with each query. This is performed by the router 138, in one example. It will be recognized that the operations may be performed by any suitable component and in any suitable order.

FIG. 4 illustrates one example of a method for managing queries for processing operations on one or more data sets by back-end computer resources and in particular, a method for routing the plurality of queries to appropriate computation modules of different types. This diagram is merely an example, which should not unduly limit the scope of the claims. One of ordinary skill in the art would recognize many variations, alternatives, and modifications. In certain implementations, the method includes the router 138 filtering each of the queries based on data representing the module type, such as module type data 205. This is shown in block 400. As shown in block 402, the method includes, for each query having a same computation module type, evaluating metadata associated with each query to determine a trust level of the query. For example, query information 210 in one example, contains data indicating a trust level of the query such as a low trust or high trust level. The trust level data is provided, in certain implementations, by each of the differing applications 114 as part of the job specification. For example, client application type 1 may be a data analytics application that causes the system 100 to perform operations on one or more data sets. The system 100 may employ a trust level designation for each application so that each application can indicate its trust level to the resource allocation system through a configuration file, through the query, or any other mechanism. In other implementations, the resource allocation system may be pre-coded to treat certain applications as having high trust or low trust. In some implementations, the user defined code field 208 in the query 200 is used to determine the trust level of a client application and hence, query. For example, user defined code when included, is treated as low trust since the code was not originated by the resource allocation system 110.

For example, some queries may include user defined code to be run by the back-end compute resource to perform a processing task on one or more data sets. For example, a data analyst may include some custom design code for performing a certain transformation on a data set, where such a transformation is not a selectable option on a user interface. Running user defined code incurs a risk because, for example, it has not been tested and may include one or more bugs (e.g., a divide by zero operation, an incomplete processing flow, a clerical error or the like). In some embodiments, the router 138 is configured to determine if user defined code exists in the query and if it does, only send the query to modules that are configured to run user defined code.

As shown in block 404, for each query determined to be low trust for a user, the group manager module filters out the computation modules of a group that have been previously assigned to a different user to remove such computing resources from processing the query. In other implementations, the group manager module assigns to the query only computation modules of a group that have been previously assigned to that user. This may be performed, for example, based on the user ID included as the originator data 202 or other information so that only modules of the same user will operate the user defined code in a query associated with the same user. Stated another way, modules that are assigned to different users are filtered out.

As shown in block 406, the method includes, for remaining computation modules of a group that are assigned to the same user, the router 138 routes the query to remaining computation modules of the group based on a desired query score. For example, the router 138 and/or module group manager 142 may generate scores associated with queries prior to routing and the router routes queries having higher scores first to available modules or any other suitable operation.

For example, if a module has been used by user B for any computation, user A cannot use the module for the execution of untrusted code. If a module has been used by user A for untrusted code, the module is only used by user A going forward. As such, if a query is low trust, all modules that are not marked as low trust are filtered out. All modules marked as low trust but have already been used by a different user will also be filtered out. If a query is high trust, only modules that are designated as high trust will be selected by the router for the query. Everything else will be filtered out. The case where a user already has a module assigned to them, the high trusted query for that same user will be routed to that module without going through a filtering process if needed.

The system as such, routes each of the plurality of queries based on data representing a level of trust of the query. The data may be query information 212, that user defined code 208 exists in the query, or any other suitable indication.

Routing of the query is also based, in some implementations, on data representing a probability of cache hits associated with each of the plurality of queries. For example, certain queries may operate on data sets that are generated and other queries use previously generated data sets as inputs and as such, the output of one query may serve as the input of another and if certain queries are determined to be accessed by large number of other queries, the query is then routed ahead of other queries, for example, based on its output being determined to be highly useful for other queries.

In other implementations, the system checks a reliability of a new version of compute code for a module based on historical data 144 and the computation module type data. For example, for a given module type, a new version of module code can be launched by the module group manager and monitored over time to determine error rates of the new version of compute code. When the error rate decreases to a suitable level, more modules of that new version of compute code are created and others with an older version of compute code are terminated.

Figure 5:
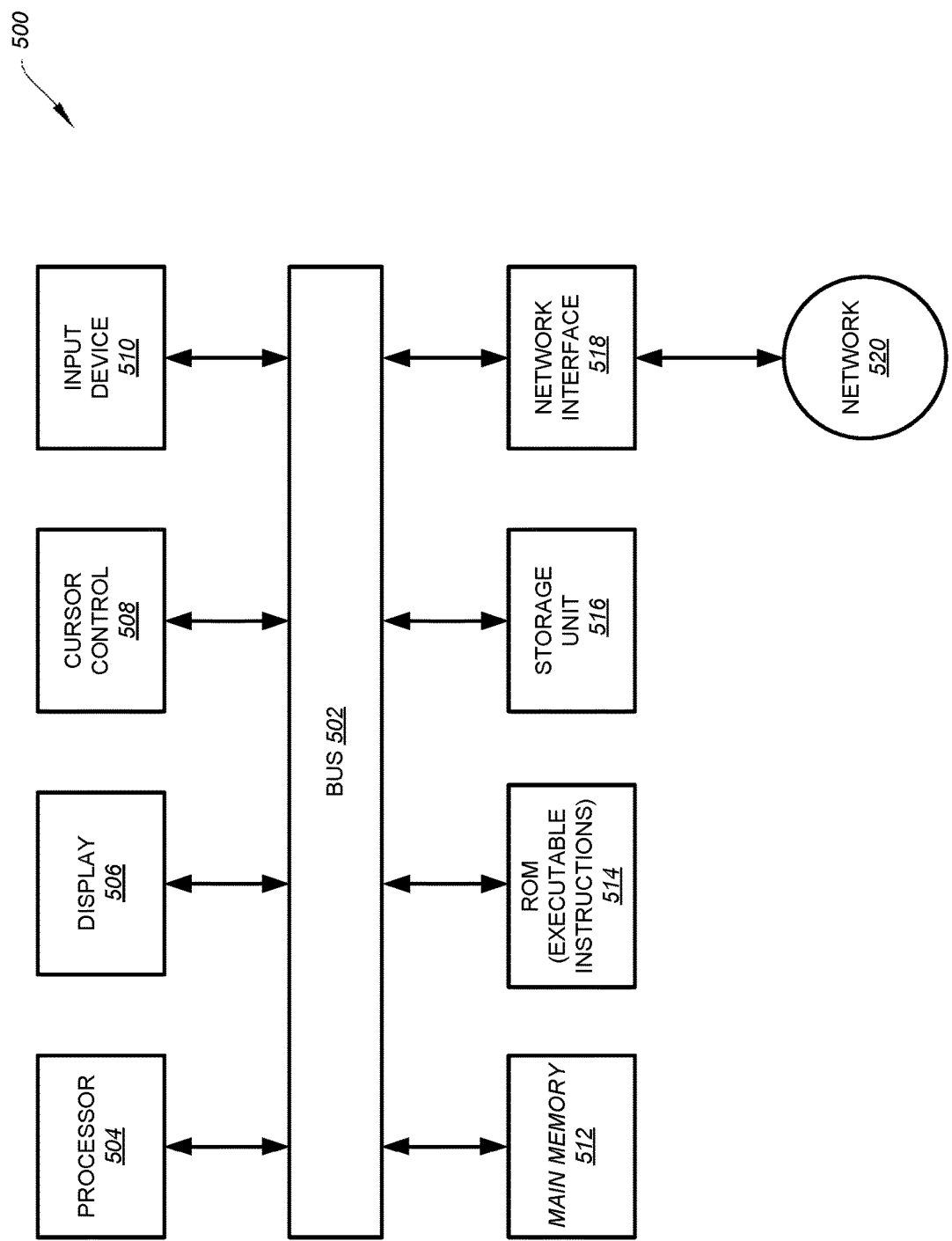
FIG. 5 is a block diagram that illustrates a computer system with which certain methods discussed herein may be implemented.

FIG. 5 is a simplified diagram showing a computing system for implementing components of the system 100 according to one embodiment of the present disclosure. This diagram is merely an example, which should not unduly limit the scope of the claims. One of ordinary skill in the art would recognize many variations, alternatives, and modifications. The computing system 500 includes a bus 502 or other communication mechanism for communicating information, a processor 504, a display 506, a cursor control component 508, an input device 510, a main memory 512, a read only memory (ROM) 514, a storage unit 516, and a network interface 518. In some embodiments, some or all processes (e.g., steps) of the method 400, the method 500, and/or the method 600 are performed by the computing system 500. In some examples, the bus 502 is coupled to the processor 504, the display 506, the cursor control component 507, the input device 510, the main memory 512, the read only memory (ROM) 514, the storage unit 516, and/or the network interface 518. In certain examples, the network interface is coupled to a network 520. For example, the processor 504 includes one or more general purpose microprocessors. In some examples, the main memory 512 (e.g., random access memory (RAM), cache and/or other dynamic storage devices) is configured to store information and instructions to be executed by the processor 504. In certain examples, the main memory 512 is configured to store temporary variables or other intermediate information during execution of instructions to be executed by processor 504. For examples, the instructions, when stored in the storage unit 516 accessible to processor 504, render the computing system 500 into a special-purpose machine that is customized to perform the operations specified in the instructions. In some examples, the ROM 512 is configured to store static information and instructions for the processor 504. In certain examples, the storage unit 516 (e.g., a magnetic disk, optical disk, or flash drive) is configured to store information and instructions.

In some embodiments, the display 506 (e.g., a cathode ray tube (CRT), an LCD display, or a touch screen) is configured to display information to a user of the computing system 500. In some examples, the input device 510 (e.g., alphanumeric and other keys) is configured to communicate information and commands to the processor 504. For example, the cursor control 508 (e.g., a mouse, a trackball, or cursor direction keys) is configured to communicate additional information and commands (e.g., to control cursor movements on the display 506) to the processor 504.

In some embodiments, some or all processes (e.g., steps) of the method 300 are performed by the system 100. In certain examples, some or all processes (e.g., steps) of the method 300 are performed by a computer and/or a processor directed by a code. For example, a computer includes a server computer and/or a client computer (e.g., a personal computer). In some examples, some or all processes (e.g., steps) of the method 300 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, some or all processes (e.g., steps) of the method 400 are performed by the system 100. In certain examples, some or all processes (e.g., steps) of the method 400 are performed by a computer and/or a processor directed by a code. For example, a computer includes a server computer and/or a client computer (e.g., a personal computer). In some examples, some or all processes (e.g., steps) of the method 400 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, a method for managing queries for processing operations on one or more data sets by back-end compute resources includes providing a first group of computation modules configured to provide back-end compute resources for a first type of computation module and providing a second group of computation modules configured to provide back-end compute resources for a second type of computation module, wherein the second type of computation module is different from the first type of computation module. In The method also includes identifying a type of computation module needed by each of a plurality of queries associated with differing types of client applications based on computation module type associated with each query, and routing each of the plurality of queries to an appropriate computation module within the first group or the second group of computation modules based on the computation module type associated with each query. For example, the method is implemented according to at least FIG. 1, FIG. 2, FIG. 3 and/or FIG. 5.

In certain examples, the method includes routing each of the plurality of queries by routing a query based on data representing a level of trust of the query. In some examples, the method includes routing each of the plurality of queries by filtering each of the queries based on data representing the computation module type, for each query having a same computation module type. In some examples, the method includes evaluating metadata associated with each query to determine a trust level of the query and for each query determined to be low trust for a user, filtering out computation modules of a group that have been previously assigned to a different user to remove such computing resources from processing the query, and for remaining computation modules of a group that are assigned to the same user, route the query to remaining computation modules of the group based on a desired query score.

In certain examples the method further includes scaling a number of computation modules in each of the first and second group of computation modules based on the computation module type. In some examples, the method includes routing each of the plurality of queries by routing a query based on data representing a probability of cache hits associated with each of the plurality of queries. In certain examples the method includes checking a reliability of a new version of compute code used by each of the first and second group of computation modules based on historical data and the computation module type data.

In some examples the method further includes providing an application interface (API) configured to interface with the differing types of client applications and to produce configuration data for a module group manager to configure and manage the first and second groups of computation modules.

In certain examples, the method further includes providing an application interface (API) configured to interface with the differing types of client applications and to provide a single interactive computation query for processing that includes individual queries by different types of applications.

According to some embodiments, a system for managing queries for processing operations on one or more data sets by back-end compute resources includes one or more processors, and a non-transitory storage medium that comprises executable instructions that when executed by the one or more processors, causes the system to provide a first group of computation modules configured to provide back-end compute resources for a first type of computation module by back-end compute resources and provide a second group of computation modules configured to provide back-end compute resources for a second type of computation module by back-end compute resources, wherein the second type of computation module is different from the first type of computation module. In certain examples, the one or more processors execute stored instructions that cause the system to identify a type of computation module needed by each of a plurality of queries associated with differing types of client applications based on computation module type data associated with each query and route each of the plurality of queries to an appropriate computation module within the first group or the second group of computation modules based on the computation module type data associated with each query. For example, the system is implemented according to at least FIG. 1, FIG. 2, FIG. 3 and/or FIG. 5.

In some embodiments the non-transitory storage medium includes executable instructions that when executed by the one or more processors, causes the system to route each of the plurality of queries by routing a query based on data representing a level of trust of the query.

In certain examples, the non-transitory storage medium includes executable instructions that when executed by the one or more processors, causes the system to route each of the plurality of queries by at least filtering each of the queries based on data representing the computation module type and for each query having a same computation module type, evaluating metadata associated with each query to determine a trust level of the query. For each query determined to be low trust for a user, filtering out computation modules of a group that have been previously assigned to a different user to remove such computing resources from processing the query, and for remaining computation modules of a group that are assigned to the same user, route the query to remaining computation modules of the group based on a desired query score.

In some examples, the non-transitory storage medium includes executable instructions that when executed by the one or more processors, causes the system to scale a number of computation modules in each of the first and second group of computation modules based on the computation module type.

In certain examples, the non-transitory storage medium includes executable instructions that when executed by the one or more processors, causes the system to route a query based on data representing a probability of cache hits associated with each of the plurality of queries.

In some examples, the non-transitory storage medium includes executable instructions that when executed by the one or more processors, causes the system to check a reliability of a new version of compute code used by each of the first and second group of computation modules based on historical data and the computation module type data.

In certain examples, the non-transitory storage medium includes executable instructions that when executed by the one or more processors, causes the system to provide an application interface (API) configured to interface with the differing types of client applications and to produce configuration data for a module group manager to configure and manage the first and second groups of computation modules.

In some examples, the non-transitory storage medium includes executable instructions that when executed by the one or more processors, causes the system to provide an application interface (API) configured to interface with the differing types of client applications and to provide a single interactive computation query for processing that includes individual queries by different types of applications.

According to certain embodiments, a non-transitory storage medium includes executable instructions that when executed by one or more processors, causes the one or more processors to provide a first group of computation modules configured to provide back-end compute resources for a first type of computation module by back-end compute resources and provide a second group of computation modules configured to provide back-end compute resources for a second type of computation module by back-end compute resources, wherein the second type of computation module is different from the first type of computation module. In some examples the storage medium includes executable instructions that when executed by the one or more processors causes the one or more processors to identify a type of computation module needed by each of a plurality of queries associated with differing types of client applications based on computation module type data associated with each query and route each of the plurality of queries to an appropriate computation module within the first group or the second group of computation modules based on the computation module type data associated with each query. For example, the storage medium and one or more processors are implemented according to at least FIG. 1, FIG. 2, FIG. 3 and/or FIG. 5.

In some examples, the non-transitory storage medium includes executable instructions that when executed by the one or more processors, causes the one or more processors to route each of the plurality of queries by routing a query based on data representing a level of trust of the query.

In certain examples, the non-transitory storage medium includes executable instructions that when executed by the one or more processors, causes the one or more processors to route each of the plurality of queries by at least filtering each of the queries based on data representing the computation module type and for each query having a same computation module type, evaluating metadata associated with each query to determine a trust level of the query. In some examples, the non-transitory storage medium includes executable instructions that when executed by the one or more processors, causes the one or more processors to, for each query determined to be low trust for a user, filtering out computation modules of a group that have been previously assigned to a different user to remove such computing resources from processing the query, and for remaining computation modules of a group that are assigned to the same user, route the query to remaining computation modules of the group based on a desired query score.

In certain examples, the non-transitory storage medium includes executable instructions that when executed by the one or more processors, causes the one or more processors to scale a number of computation modules in each of the first and second group of computation modules based on the computation module type.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for managing queries by back-end compute resources, the method comprising:
    providing a first group of computation modules configured to provide the back-end compute resources using a first type of computation modules;
    providing a second group of computation modules configured to provide the back-end compute resources using a second type of computation modules, wherein the second type of computation module is programmed using a different programming code language from the first type of computation module;
    identifying a computation module type needed by each query of a plurality of queries associated with one or more different types of client applications based on a query type associated with a corresponding query, wherein the corresponding query requests processing operations on one or more data sets by an identified type of computation modules, wherein the query type associated with the corresponding query indicates a type of processing; and
    routing each query of the plurality of queries to an appropriate computation module type within the first group or the second group of computation modules based on the computation module type identified for the corresponding query by at least:
        evaluating metadata associated with a first query of the plurality of queries to determine a trust level of the first query;
        selecting a group of computation modules based on a computation module type identified for the first query; and
        in response to the first query being determined as a low trust for a first user, removing one or more computation modules in the selected group of computation modules that have been previously assigned to a second user from processing the first query, the second user being different from the first user;
    wherein the method is carried out by one or more processors.

2. The method of claim 1, wherein the routing each query of the plurality of queries comprises routing the corresponding query based on data representing a level of trust of the corresponding query.

3. The method of claim 1, wherein the routing each query of the plurality of queries comprises:
    routing the first query to one or more computation modules in the selected group of computation modules that have been previously assigned to the first user based on a desired query score.

4. The method of claim 1, further comprising scaling a number of computation modules in the first and second group of computation modules based on the computation module type identified for the corresponding query.

5. The method of claim 1, wherein the routing of each query of the plurality of queries comprises routing the corresponding query based on data representing a probability of cache hits associated with the corresponding query.

6. The method of claim 1, comprising checking a reliability of a new version of compute code used by each of the first and second group of computation modules based on historical data and the computation module type identified for the corresponding query.

7. The method of claim 1, further comprising providing an application interface (API) configured to interface with the one or more different types of client applications and to produce configuration data for a module group manager to configure and manage the first and second groups of computation modules.

8. The method of claim 1, further comprising providing an application interface (API) configured to interface with the one or more different types of client applications and to provide a single interactive computation query for processing that includes individual queries by the one or more different types of client applications.

9. A system for managing queries by back-end compute resources, the system comprising:
  one or more processors; and
  a non-transitory storage medium that comprises executable instructions that when executed by the one or more processors, causes the system to:
    provide a first group of computation modules configured to provide the back-end compute resources using a first type of computation modules;
    provide a second group of computation modules configured to provide the back-end compute resources using a second type of computation modules, wherein the second type of computation modules is programmed using a different programming code language from the first type of computation modules;
    identify a computation module type needed by each query of a plurality of queries associated with one or more different types of client applications based on a query type associated with a corresponding query, wherein the corresponding query requests processing operations on one or more data sets by an identified type of computation modules, wherein the query type associated with the corresponding query indicates a type of processing; and
    route each query of the plurality of queries to an appropriate computation module within the first group or the second group of computation modules based on the computation module type identified for the corresponding query by at least:
      evaluating metadata associated with a first query of the plurality of queries to determine a trust level of the first query;
      selecting a group of computation modules based on a computation module type identified for the first query; and
      in response to the first query being determined as a low trust for a first user, removing one or more computation modules of the selected group of computation modules that have been previously assigned to a second user from processing the first query, the second user being different from the first user.

10. The system of claim 9, wherein the non-transitory storage medium comprises executable instructions that when executed by the one or more processors, causes the system to route each of the plurality of queries by routing the query based on data representing a level of trust of the query.

11. The system of claim 9, wherein the non-transitory storage medium comprises executable instructions that when executed by the one or more processors, causes the system to route each query of the plurality of queries by at least:
  routing the first query to one or more computation modules of the selected group of computation modules that have been previously assigned to the first user based on a desired query score.

12. The system of claim 9, wherein the non-transitory storage medium comprises executable instructions that when executed by the one or more processors, causes the system to scale a number of computation modules in the first and second group of computation modules based on the computation module type identified for the corresponding query.

13. The system of claim 9, wherein the non-transitory storage medium comprises executable instructions that when executed by the one or more processors, causes the system to route the corresponding query based on data representing a probability of cache hits associated with the corresponding query.

14. The system of claim 9, wherein the non-transitory storage medium comprises executable instructions that when executed by the one or more processors, causes the system to check a reliability of a new version of compute code used by each of the first and second group of computation modules based on historical data and the computation module type identified for the corresponding query.

15. The system of claim 9, wherein the non-transitory storage medium comprises executable instructions that when executed by the one or more processors, causes the system to provide an application interface (API) configured to interface with the one or more different types of client applications and to produce configuration data for a module group manager to configure and manage the first and second groups of computation modules.

16. The system of claim 9, wherein the non-transitory storage medium comprises executable instructions that when executed by the one or more processors, causes the system to provide an application interface (API) configured to interface with the one or more different types of client applications and to provide a single interactive computation query for processing that includes individual queries by the one or more different types of client applications.

17. A non-transitory storage medium that comprises executable instructions that when executed by one or more processors, causes the one or more processors to:
  provide a first group of computation modules configured to provide the back-end compute resources using a first type of computation modules;
  provide a second group of computation modules configured to provide the back-end compute resources using a second type of computation modules, wherein the second type of computation modules is programmed using a different programming code language from the first type of computation modules;
  identify a computation module type needed by each query of a plurality of queries associated with differing types of client applications based on a query type associated with a corresponding query, wherein the corresponding query requests processing operations on one or more data sets by an identified type of computation modules, wherein the query type associated with the corresponding query indicates a type of processing; and
  route each of the plurality of queries to an appropriate computation module within the first group or the second group of computation modules based on the computation module type identified for the corresponding query by at least:

evaluating metadata associated with a first query of the plurality of queries to determine a trust level of the first query;

selecting a group of computation modules based on a computation module type identified for the first query; and in response to the first query being determined as a low trust for a first user, removing one or more computation modules of the selected group of computation modules that have been previously assigned to a second user from processing the first query, the second user being different from the first user.

18. The non-transitory storage medium of claim 17 comprising executable instructions that when executed by the one or more processors, causes the one or more processors to route each query of the plurality of queries by routing the corresponding query based on data representing a level of trust of the query.

19. The non-transitory storage medium of claim 17 comprising executable instructions that when executed by the one or more processors, causes the one or more processors to route each query of the plurality of queries by at least:

routing the first query to one or more computation modules of the selected group of computation modules that have been previously assigned to the first user based on a desired query score.

20. The non-transitory storage medium of claim 17 comprising executable instructions that when executed by the one or more processors, causes the one or more processors to scale a number of computation modules in each of the first and second group of computation modules based on the computation module type identified for the corresponding query.

* * * * *